J. A. H. Ellis,

Vapor Engine Generator.

No. 111,331. Patented Jan. 31, 1871.

Witnesses:
Inventor:

UNITED STATES PATENT OFFICE.

JOEL A. H. ELLIS, OF SPRINGFIELD, VERMONT.

IMPROVEMENT IN VAPOR-GENERATORS FOR VAPOR-ENGINES.

Specification forming part of Letters Patent No. 111,331, dated January 31, 1871.

*To all whom it may concern:*

Be it known that I, JOEL A. H. ELLIS, of Springfield, in the county of Windsor and State of Vermont, have invented a new and useful Improvement in Vapor-Generators for Vapor-Engines; and I do hereby declare that the following is a full, clear, and exact description thereof, which will enable others skilled in the art to make and use the same, reference being had to the accompanying drawing, forming part of this specification.

Figure 1:
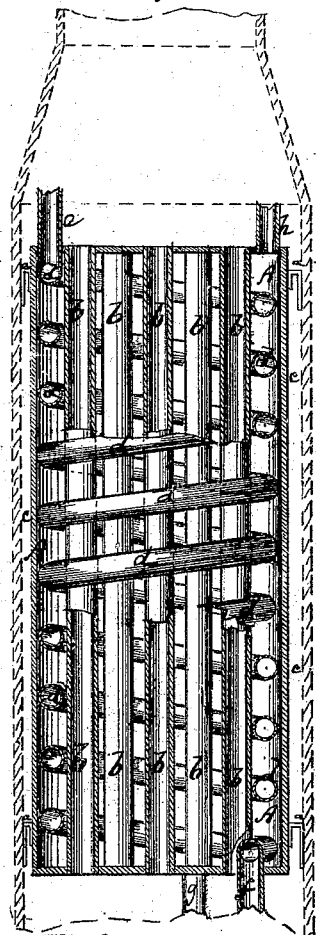
Figure 1:
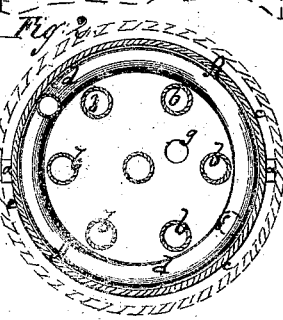

Figure 1 represents a sectional side view of my invention. Fig. 2 is a horizontal section of the same.

Similar letters of reference indicate corresponding parts.

This invention relates to a new means of utilizing the escape-heat of a furnace and steam-engine, for the purpose of vaporizing gasoline or other volatile substance used in a vapor-engine.

The invention consists in an arrangement of generator for employing the heat from the escaping products of combustion from the furnace of a steam-boiler jointly with the latent heat from the exhaust-steam from a steam-engine, for which purpose the said products of combustion, after leaving the steam-boiler, are directed through flues in, beneath, or around a vapor-generator containing a fluid that vaporizes at a much lower temperature than water, and the exhaust-steam from the steam-engine is passed through tubes within such vapor-generator, and is condensed therein, imparting its latent heat to the fluid contained in the generator.

The vapors produced in this vapor-generator containing a suitable fluid will exert an expansive force of fifty pounds to the square inch at a temperature so low as to condense the exhaust-steam, and in sufficient quantity to increase the power derived from a given quantity of fuel at least one hundred and twenty-five per cent.

When employed in a separate engine or cylinder, and after being so employed, the vapors are condensed and returned to the vapor-generator. By this means a large amount of heat is utilized and made effective that is allowed to escape and pass away in an ordinary steam-engine.

A in the drawing represents a sheet-metal vapor-generating vessel, of cylindrical or other suitable form, supported by means of brackets *a a*, or otherwise, within the escape-flue of a steam-boiler furnace. This vessel may be provided with smoke-pipes *b b*, which penetrate it from end to end; and, furthermore, it is shown as surrounded by a smoke-space, *c*.

*d* is a worm or coiled steam-pipe arranged within the vessel A, and connected at one end by a pipe, *e*, with the exhaust-pipe of a steam-engine. The other end enters a pipe, *f*, that leads to the water-tank or other suitable receptacle.

The steam-engine is to be supplied with steam from the boiler, and the products of combustion passing away from that boiler enter the flues *b* or *c*, or both.

The exhaust-steam in passing through the worm is condensed, and gives off its latent heat to the contents of the vessel A. The products of combustion which pass through the flues *b* or *c* will also impart heat to the contents of the vessel A.

A pipe, G, leads into the vessel A for supplying the same with gasoline or other volatile matter, and a pipe, *h*, carries the vapors from the same to the engine.

Having thus described my invention, I claim as new and desire to secure by Letters Patent—

The vaporizing-vessel A, containing a fluid that vaporizes at a low temperature, and heated by the joint action of the escaping products of combustion from a steam-boiler furnace and the exhaust-steam from an engine passing through separate tubes or flues, substantially as specified.

JOEL A. H. ELLIS.

Witnesses:
T. B. MOSHER,
GEO. W. MABEE.